US006378462B1

(12) United States Patent
Gaves et al.

(10) Patent No.: US 6,378,462 B1
(45) Date of Patent: Apr. 30, 2002

(54) CAT MASSAGING AND GROOMING DEVICE

(75) Inventors: Jim Gaves, Chateauguay; Robin Plante, Lery, both of (CA)

(73) Assignee: Rolf C. Hagen, Inc., Montreal (CA)

( * ) Notice: Subject to any disclaimer, the term of this patent is extended or adjusted under 35 U.S.C. 154(b) by 0 days.

(21) Appl. No.: 09/564,886

(22) Filed: May 4, 2000

Related U.S. Application Data
(60) Provisional application No. 60/133,358, filed on May 10, 1999.

(51) Int. Cl.$^7$ ............................................. A01K 13/00
(52) U.S. Cl. ........................................................ 119/621
(58) Field of Search .................. 119/611–633, 706, 119/707, 621; D30/158, 159, 160

(56) References Cited

U.S. PATENT DOCUMENTS

| 348,782 A | * | 9/1886 | Sawyer | 52/177 |
|---|---|---|---|---|
| 3,107,665 A | * | 10/1963 | Nordgren | 601/134 |
| 3,482,548 A | * | 12/1969 | Burns | 119/706 |
| 4,747,371 A | * | 5/1988 | Leopold | 119/602 |
| 5,517,945 A | * | 5/1996 | Udelle | 119/608 |
| 5,540,186 A | * | 7/1996 | Udelle | 119/609 |
| 5,579,725 A | * | 12/1996 | Boshears | 119/706 |
| 5,630,378 A | * | 5/1997 | Multala | 119/621 |
| D387,512 S | * | 12/1997 | Bergman et al. | D30/158 |
| 5,842,440 A | * | 12/1998 | Bell, Jr. et al. | 119/621 |
| 6,021,542 A | * | 2/2000 | Norman | 15/169 |

\* cited by examiner

*Primary Examiner*—Charles T. Jordan
*Assistant Examiner*—Jordan Lofdahl
(74) *Attorney, Agent, or Firm*—Wolf, Greenfield & Sacks, P.C.

(57) ABSTRACT

An activity center for cats includes a plurality of stations for grooming, massaging and stimulating the animal. The stations have wave-shaped fins, comb-like tines and raised pads performing those functions.

22 Claims, 6 Drawing Sheets

CAT MASSAGING AND GROOMING DEVICE

PRIORITY CLAIM

This application claims priority based upon copending provisional application Ser. No. 60/133,358 filed May 10, 1999.

This invention relates to an activity center for small animals and more particularly cats and includes a number of separate stations for massaging, grooming and stimulating the animal.

SUMMARY OF THE INVENTION

In accordance with the present invention, the activity center comprises a tray having a number of different stations, such as a massager, a gum stimulator, a comb-like groomer and a pressure pad that preferably includes a plurality of small bumps that provide pressure points for the paws of the animal. The pad may be large enough for the animal to recline on it. In the preferred form of the invention, a number of comb-like groomers and pressure pads are spaced apart about the periphery of the tray and surround the massager that has an array of rippled fins. Also in the preferred form, the massager and comb-like groomers are removably attached to the tray so that they may be conveniently cleaned and reattached to it. Also in the preferred form of the invention, the massager is dome-shaped and has a catnip well in its surface closely adjacent the gum stimulator and the comb-like groomers also have chambers for catnip that are accessible to a cat lying on any of the pressure pads.

BRIEF FIGURE DESCRIPTION

DETAILED DESCRIPTION

Figure 1:
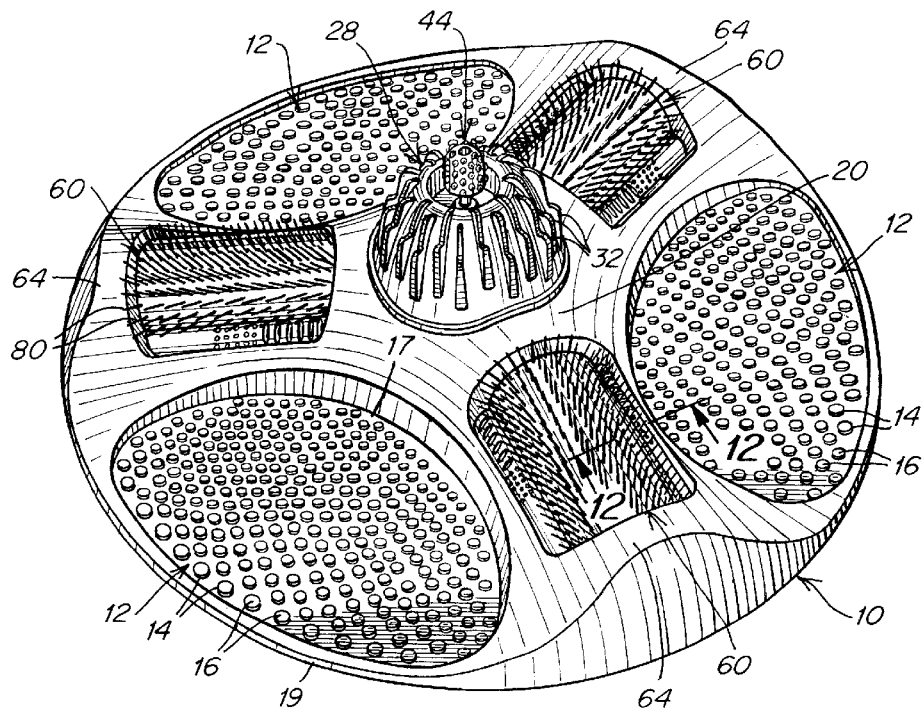
FIG. 1 is a top perspective view of the cat massaging and grooming device embodying this invention.

The massaging and grooming device shown in FIG. 1 includes a round tray 10 that in the preferred embodiment is approximately 20" in diameter and molded of a plastic material such as general purpose styrene. The tray on its upper surface includes a plurality of pads 12 molded as an integral part of the tray, and each pad 12 has an array of bumps 14 on its upper surface. The bumps are of different sizes and each is provided with a flat top 16. The bumps are designed to provide a unique sensory experience for cats, particularly to their paws, and the flat character of the bumps makes the pads comfortable for the cat to sleep on. It will be noted in the drawing that the diameter of the bumps on the pads gradually increases from the inner edge 17 of each pad closer to the center of the tray, toward the outer edge of the pad at the periphery 19 of the tray. While in the preferred embodiment shown, three such pads appear, it is to be understood that any number of pads may be employed.

Figure 2:
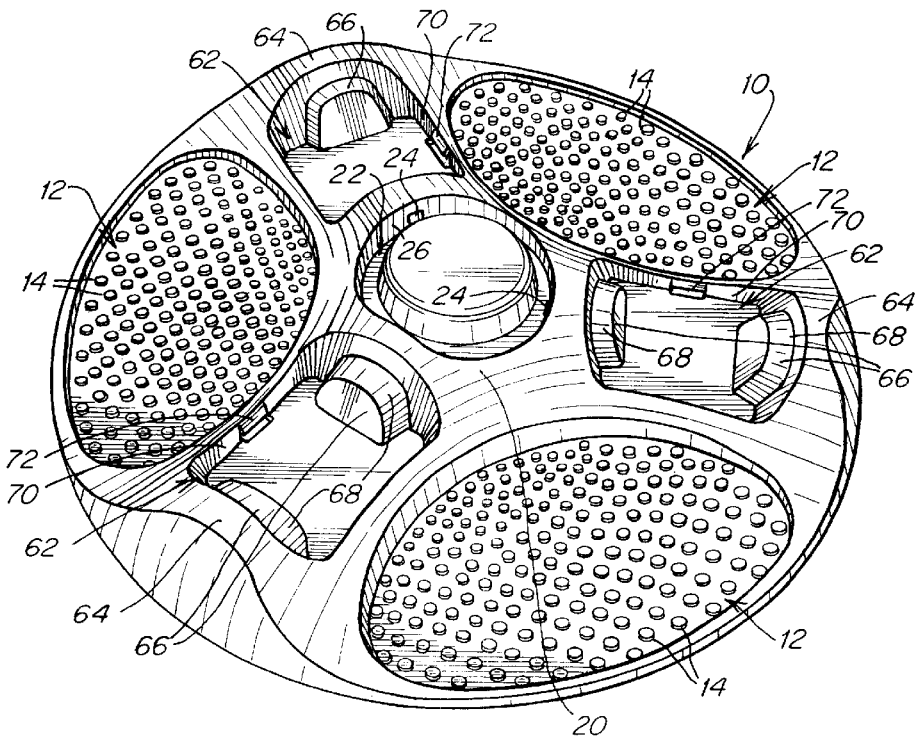
FIG. 2 is a top perspective view of the tray of the device shown in FIG. 1.
Figure 3:
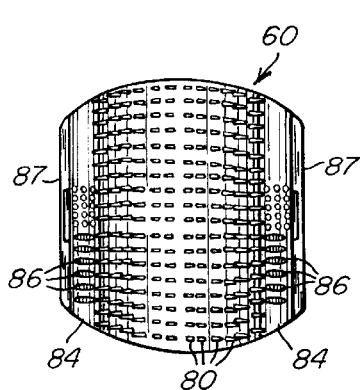
FIG. 3 is a top plan view of one detachable groomer of which three are shown in FIG. 1 mounted on the tray.
Figure 7:
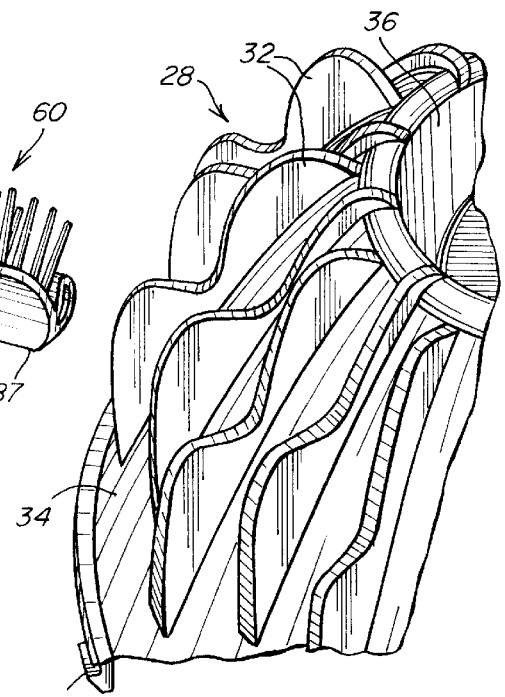
Figure 10:
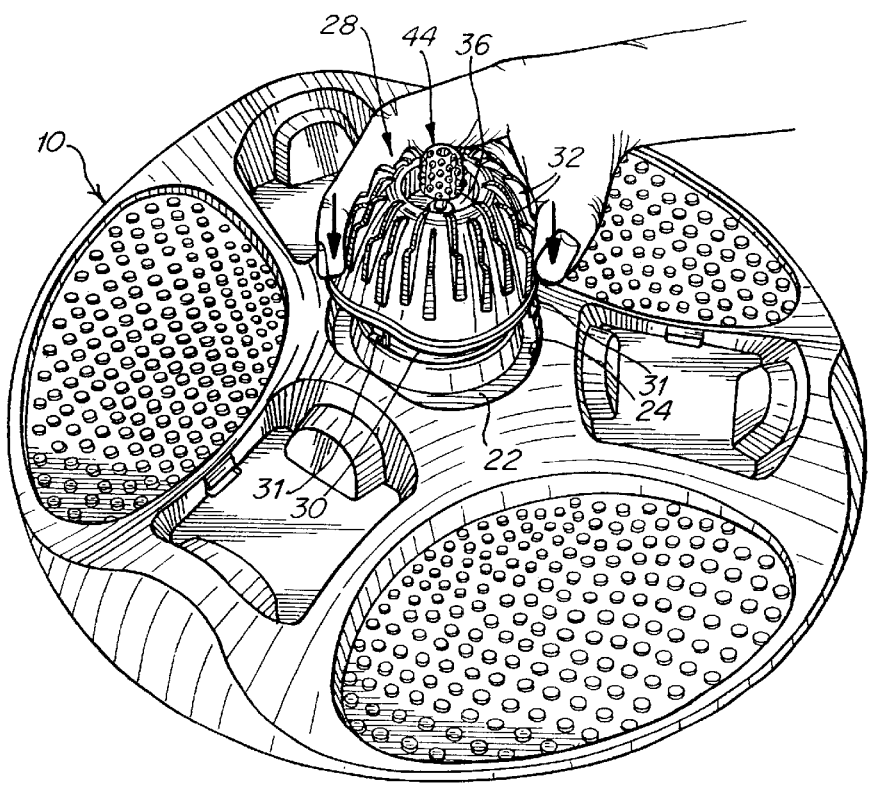
FIGS. 10 and 11 are perspective views of the massager and groomer, respectively, showing the manner each is mounted on the tray.

The tray has a raised central portion 20 that at its top includes a circular channel 22 having a number of openings 24 in its outer peripheral wall 26. (See FIG. 2) Mounted on the tray 10 is a dome-shaped ripple massager 28 whose lower edge 30 sits in the circular channel 22. The lower edge 30 of the dome-shaped massager carries a number of hook-like fasteners 31 (see FIG. 10) that snap into the openings 24 so as to yieldably retain the dome-shaped massager in place on the raised central portion 20 of the tray. The massager 28 carries on its outer surface, an array of wave-shaped fins 32 clearly shown in FIG. 7 that converge upwardly on the surface 34 of the massager.

Figure 9:
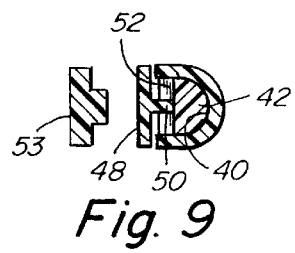
FIG. 9 is a cross-sectional view taken along the section line 9—9 in FIG. 8.

The massager 28 has a well 36 at its top, on the bottom wall 38 of which is an opening 40 that receives the stem 42 of a gum stimulator 44. To hold the stem 42 of the gum stimulator 44 in place, a boss 43 is formed on the bottom wall 3 8 of the well, having a central passage 45 that forms a continuation of the opening 40. The openings 40 and 45 and the stem 42 of the gum stimulator are non-circular in cross-section (see FIG. 9) so as to provide a specific orientation for the stem in the openings. On the bottom surface of the bottom wall 38 of well 36 is a blade 48 that carries a detent 50 which engages a notch 52 in the stem 42 when the stem is filly inserted in the openings 40 and 45. The blade must be displaced away from the stem so as to cause the detent to disengage the groove 52 when the stimulator 44 is to be removed. In the preferred embodiment, a stop 53 is provided adjacent the blade 44 so as to limit the degree of deflection afforded the blade.

The wave-shaped fins 32 on the ripple massager 28 provide a brush-like action on the cat's fur. The fins penetrate deeply into the fur and also provide an intense rubbing pleasure to the head, neck and face of the cat. The maximum height of the fins 32 is approximately 5/16.

Figure 11:
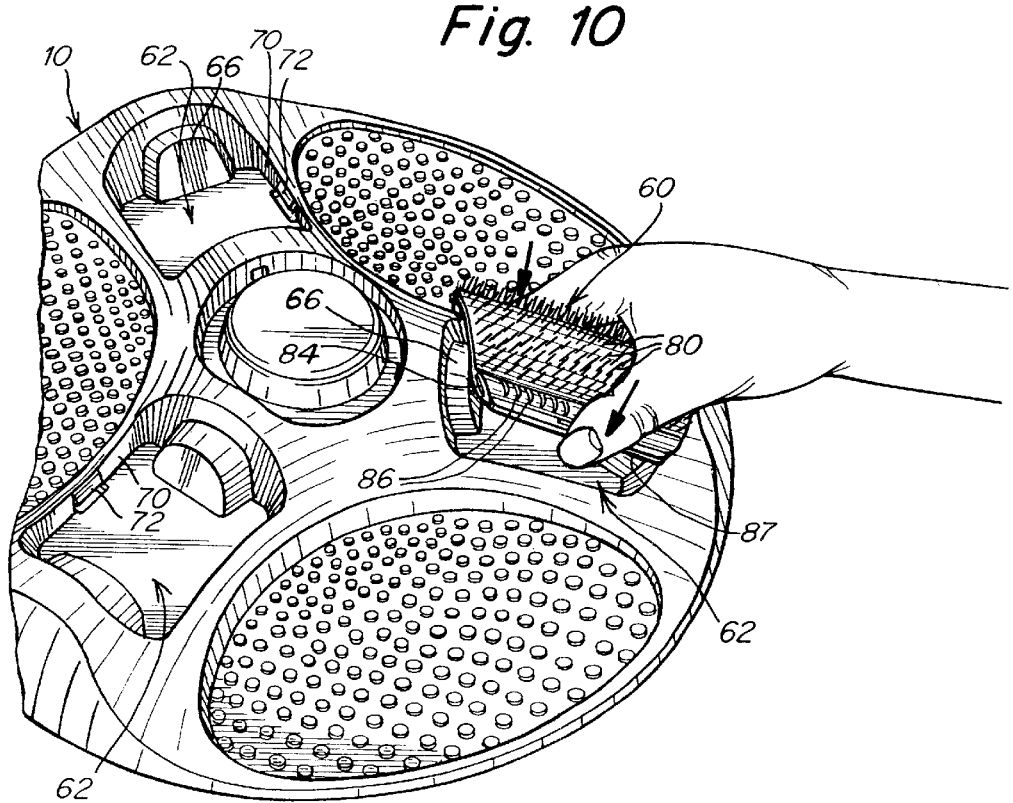
Figure 12:
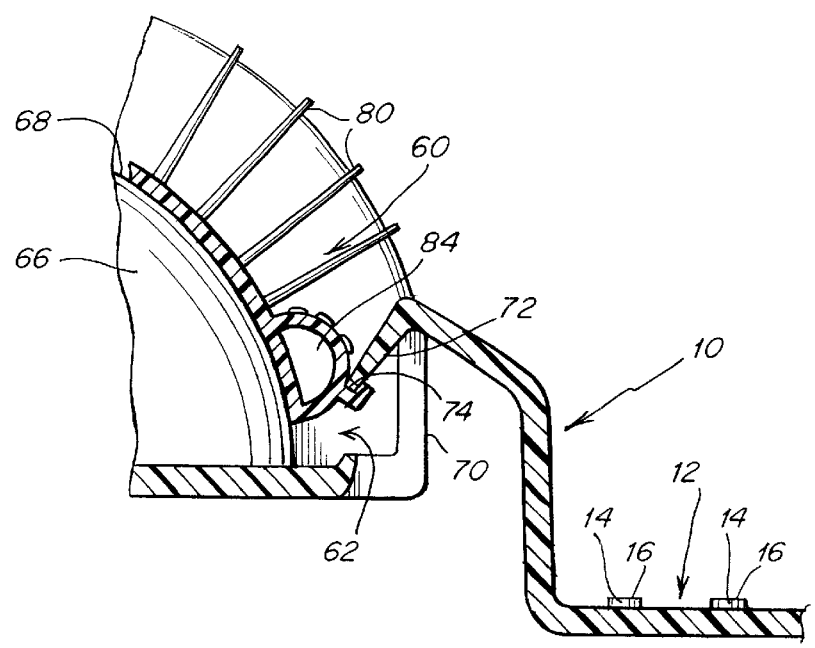
FIG. 12 is a cross-sectional view showing how the groomers are attached to the tray.

In the preferred embodiment shown, three body stroke groomers 60 are provided. It will be noted in FIG. 1 that the groomers 60 are alternately arranged with the pads 12 in a circular array about the raised elevated central portion 20 of the tray. The tray is provided with separate wells 62 (see FIG. 2) for each of the groomers. The wells 62 extend between the sides of the central raised portion 20 of the tray and raised tray portions 64 at the tray periphery. A pair of arcuate bosses 66 for supporting the groomer 60 is provided in each of the wells 62. Each of the bosses 66 has a curved surface 68 on which the ends of the groomer rest. As shown in FIG. 12, the side walls 70 of each well 62 carry downwardly extending fingers 72 that engage the upwardly open channels 74 on the sides of the groomers 60. The fingers 72 and channels 74 enable the groomers to be snapped into place and be removed for cleaning, etc. FIG. 11 shows how the groomers are flexed into an arc for installation and removal.

Figure 6:
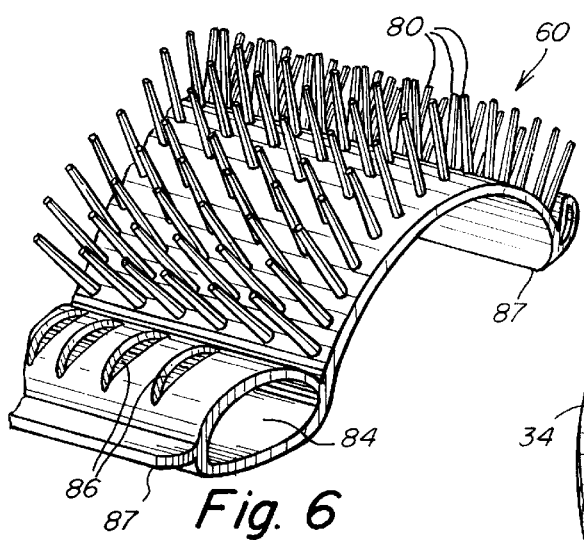

Each groomer on its upper surface carries an array of closely spaced tines 80 (see FIG. 6). The tines are arranged in the preferred embodiment in 18 transverse rows, each containing 16 tines. The tines are approximately ½ in length and are somewhat flexible so that they may deflect when a cat rubs its fur against them. The tines provide means for self-grooming and massage. They also may be used to stimulate the face and back glands of the animal and provide an easy-access, intense massage for the cat.

Figure 4:
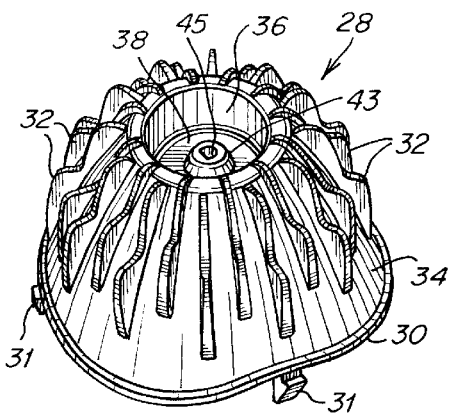
FIG. 4 is perspective view of the ripple massager shown in the assembly of FIG. 1.
Figure 5:
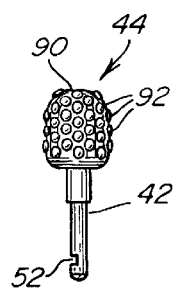
FIG. 5 is an elevation view of the gum stimulator shown in the assembly of FIG. 1, FIGS. 6 and 7 are fragmentary detail views showing, respectively, the tines of the groomer and the fins of the ripple massager of FIGS. 3 and 4.
Figure 8:
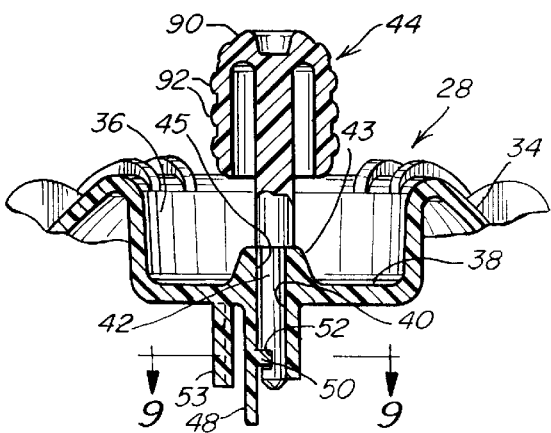
FIG. 8 is a fragmentary cross-sectional view of the gum stimulator and ripple massager showing the two assembled together.
Figure 13:
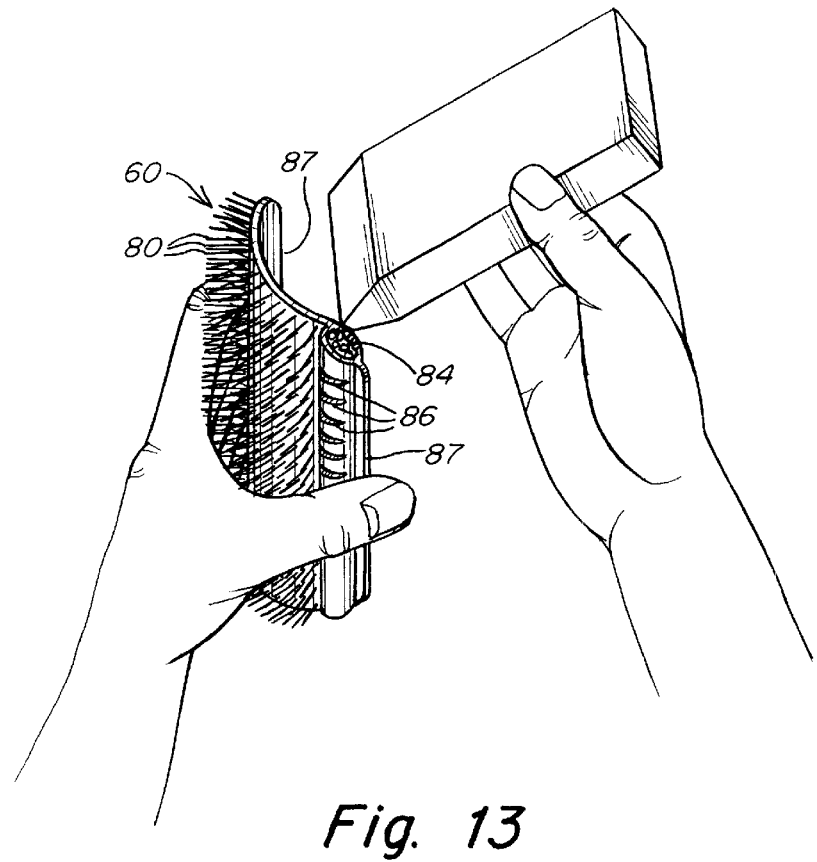
FIG. 13 is a perspective view showing how catnip may be added to the channels on the sides of the grooms.
Figure 14:
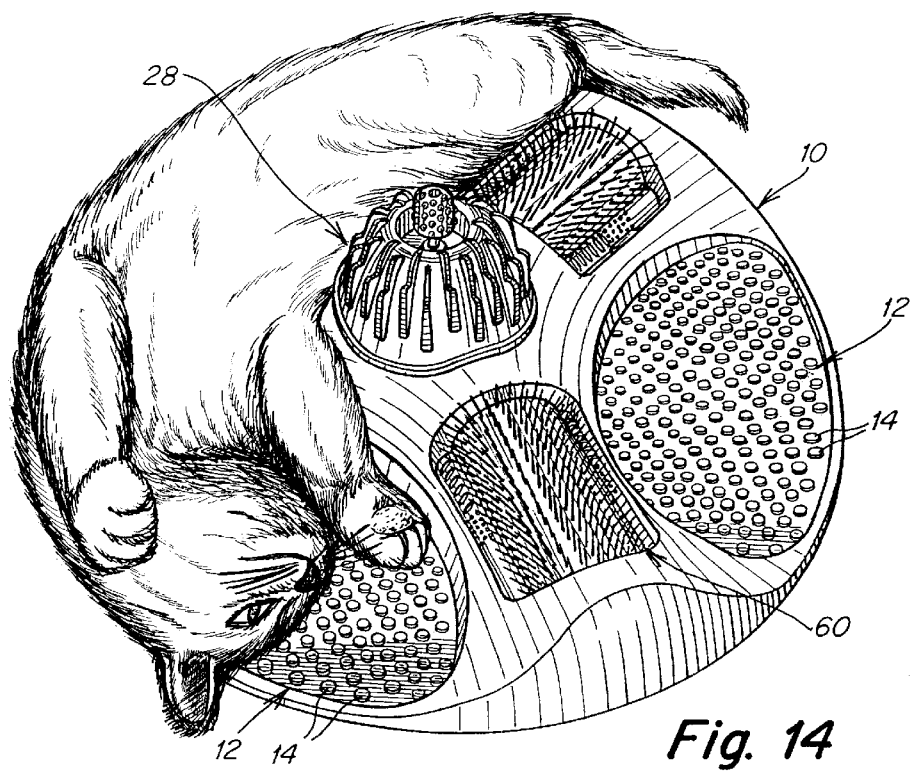
FIGS. 14–17 are illustrations showing a cat massaging and grooming itself on the pads, groomers, gum stimulator and massager.
Figure 15:
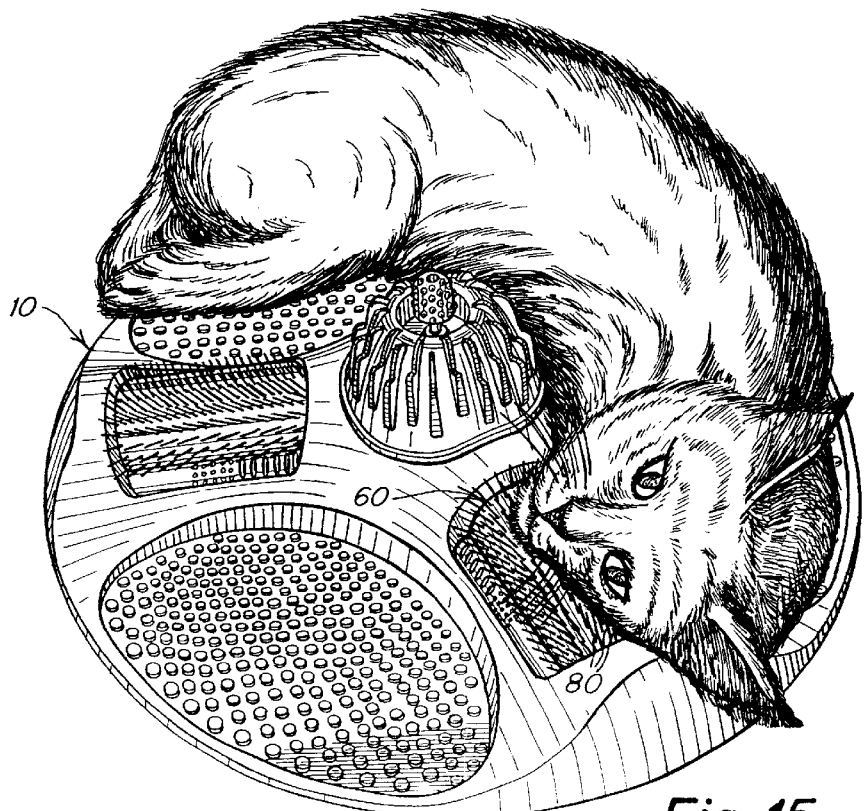
Figure 16:
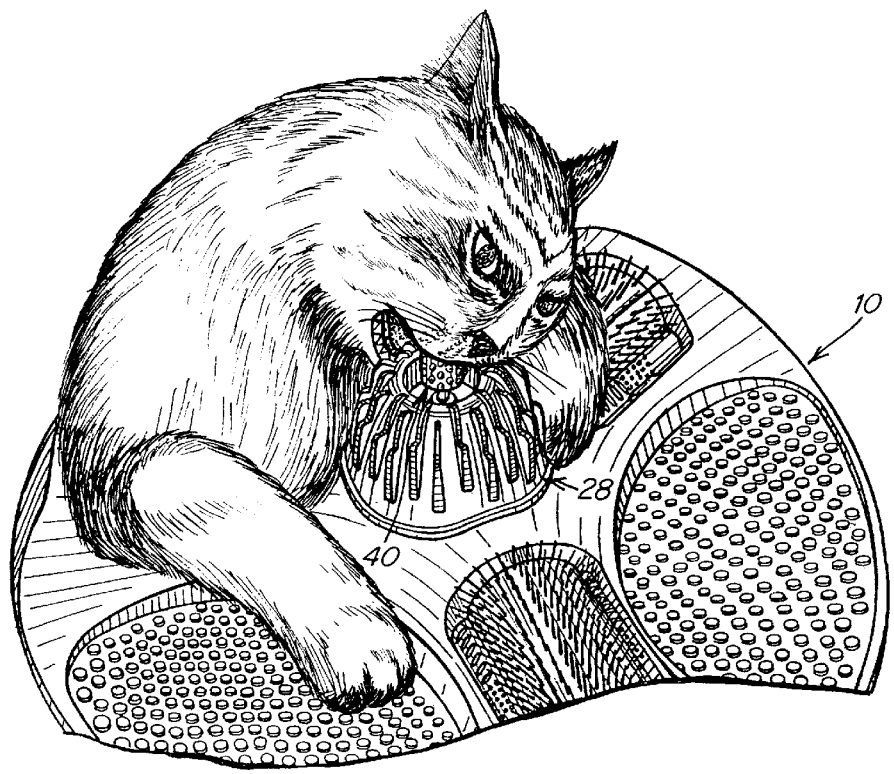
Figure 17:
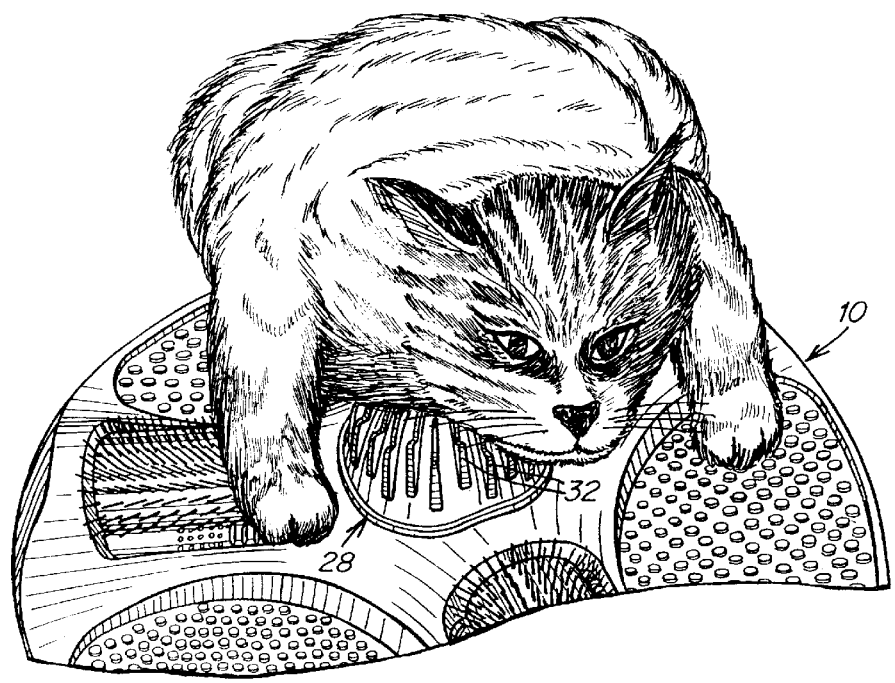

As shown in FIGS. 11–13, along the sides of each groomer 60 a trough 84 is provided that is accessible through holes 86 on the upper surface of each groomer 80. Note that the troughs 84 are provided along each of the long edges 87 of the groomers. In use, catnip or other treat may be placed in the troughs 84 as suggested in FIG. 13 as well as in the well 36 of the ripple massager 28 beneath the gum stimulator 44. (Note the well 36 in FIGS. 4 and 8).

The gum stimulator 44 includes a head 90 whose surface is covered by closely spaced short, smooth bumps 92. The head 90 of the stimulator 44 partially blocks access to the catnip in the well 36 so as to create a challenge for the cat. Gnawing the gum stimulator 44 and particularly the head 90 thereof covered by the array of bumps 92 will clean the teeth and gums. The cat will also be stimulated by rubbing its cheek and chin areas against the head 90.

The device described is most attractive to cats. They react immediately by approaching it, rubbing or rolling on it, or biting on the gum stimulator all as shown in FIGS. 14–17. It is of course, well known that cats love having their owners rub or scratch them, and they seek these stimulations by brushing up against legs or inanimate objects, like walls, chairs, etc. This is part of the animal's social behavior and provides an important part of its ability to communicate. It is also known that when cats rub their chin, lip or cheek areas, their facial glands deposit pheromones that are known to have a calming effect on cats. Thus, the present invention provides instant gratification, overwhelming pleasure and diversion for cats.

In the foregoing description each of the stations is specifically described both with respect to the manner in which they are attached to the tray or incorporated into it and to the details of the surface configuration. It should be understood, however, that those details may be modified without departing from the scope and spirit of the invention. For example, the dome-shaped ripple massager may be of a different configuration and may be permanently attached to the tray, as opposed to being removed as in the preferred embodiment shown and described above. Similarly, the comb-like groomers may be permanently attached or formed as an integral part of the tray, although the detachable configuration described in detail above is preferred. Specifically, different fasteners may be employed to attach the gum stimulator, groomers and massager to the tray such as clips, screws, poppets, etc. but preferably the fasteners are not themselves detachable from the structure as they may be lost or misplaced, and do not require tools to install or remove. Because numerous modifications may be made of the invention without departing from its spirit, the foregoing detailed description should not be limiting, but rather the scope of the invention is to be determined by the appended claims and their equivalents.

What is claimed is:

1. A cat massaging and grooming device comprising
   a tray having an upper surface,
   a dome-shaped massager attached to the upper surface of the tray, said massager having a well at its top for receiving catnip,
   a gum stimulator attached to the massager above the well,
   at least one comb-like groomer on the upper surface of the tray having an array of tines for self grooming and massaging of a cat,
   and at least one pressure pad on the upper surface of the tray having an array of small bumps for providing pressure points for the paws of a cat and on which a cat may recline.

2. A cat massaging and grooming device comprising an assembly of massaging, grooming, and gum stimulating surfaces for cast assembled as a unitary structure and organized about a generally horizontal plane.

3. A cat massaging and grooming device as defined in claim 1 wherein the massager and groomer are detachably connected to the tray.

4. A cat massaging and grooming device as defined in claim 1 wherein the massager is removable for cleaning.

5. A cat massaging and grooming device as defined in claim 1 wherein the groomer is removable for cleaning.

6. An activity station for cats comprising a tray,
   a massager attached to the tray having a plurality of wave-shaped fins disposed above the surface of the tray,
   at least one comb-like groomer on the tray having a plurality of grooming tines for a cat,
   and at least one pressure pad on the tray having a plurality of small bumps for providing pressure points for the paws or body of a cat.

7. An activity station for cats as defined in claim 2 wherein the massager has a plurality of wave-shaped fins for rubbing the head, neck and face area of a cat.

8. An activity station for cats comprising a tray,
   a massager attached to the tray,
   a catnip well provided in the massager,
   at least one comb-like groomer on the tray having a plurality of grooming tines for a cat,
   and at least one pressure pad on the tray having a plurality of small bumps for providing pressure points for the paws or body of a cat.

9. An activity station for cats as defined in claim 6 wherein the massager is detachable from the tray for cleaning.

10. An activity station for cats as defined in claim 6 wherein the groomer is detachable from the tray for cleaning.

11. An activity station for cats as defined in claim 6 wherein the pressure pad is sufficiently large for a cat to recline on.

12. An activity station for cats as defined in claim 12 wherein a plurality of pads are on the tray.

13. An activity station for cats as defined in claim 8 wherein the bumps have a flat top surface.

14. An activity station for cats as defined in claim 2 wherein the grooming surface has flexible tines for massaging and stimulating the face and back glands of a cat.

15. An activity station for cats comprising a tray,
   a massager attached to the tray having a plurality of wave-shaped fins,
   a plurality of comb-line groomers on the tray having a plurality of grooming tines for cats,
   and a plurality of pressure pads on the tray each having a plurality of small bumps for providing pressure points for the paws or body of the cat,
   said plurality of groomers and pads disposed about the periphery of the tray and the massager disposed at the approximate center of the tray.

16. An activity station for cats comprising a tray,
a massager attached to the tray and disposed at the approximate center of the tray,
a well provided in the massager for receiving catnip,
a plurality of comb-like groomers on the tray having a plurality of grooming tines for a cat and arranged about the periphery of the tray, and
a plurality of pressure pads on the tray having a plurality of small bumps for providing pressure points for the paws or body of a cat and arranged about the periphery of the tray.

17. An activity station for cats as defined in claim 16 wherein a gum stimulator is attached to the massager and partially blocking access to the well.

18. A cat activity center comprising
a tray having an upper surface,
a dome-shaped massager attached to the upper surface of the tray, said massager having a well at its top for receiving catnip, and
a gum stimulator attached to the massager above the well and partially obstructing access to the well.

19. An activity center for cats comprising
a tray,
a plurality of stations positioned about the tray for grooming, massaging and stimulating a cat that make physical contact with them,
and a gum stimulator attached to the grooming station.

20. An activity center for cats as defined in claim 19 wherein at least some of the stations are removable for cleaning.

21. An activity center for cats comprising a tray,
a plurality of stations positioned about the tray for grooming, massaging and stimulating a cat that males physical contact with them,
a recess in the center of the tray to attach one of the stations, the tray having a plurality of depressions spaced from one another and surrounding the recess, with each depression carrying other stations different from the one station.

22. An activity center for cats as defined in claim 21 wherein yet additional stations are interposed between the depressions.

* * * * *